(12) United States Patent
Basit

(10) Patent No.: US 9,102,001 B2
(45) Date of Patent: Aug. 11, 2015

(54) ROBOTIC WELDING CABLE

(71) Applicant: Nauman Basit, Windsor (CA)

(72) Inventor: Nauman Basit, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 325 days.

(21) Appl. No.: 13/778,469

(22) Filed: Feb. 27, 2013

(65) Prior Publication Data

US 2014/0217067 A1 Aug. 7, 2014

Related U.S. Application Data

(60) Provisional application No. 61/759,509, filed on Feb. 1, 2013.

(51) Int. Cl.
| | |
|---|---|
| *B23K 9/173* | (2006.01) |
| *H01B 7/282* | (2006.01) |
| *H01B 9/06* | (2006.01) |
| *H01B 9/00* | (2006.01) |

(52) U.S. Cl.
CPC ............. *B23K 9/173* (2013.01); *H01B 7/282* (2013.01); *H01B 9/001* (2013.01)

(58) Field of Classification Search
CPC .......... B23K 9/173; B23K 9/32; H01B 7/282; H01B 9/001; H01B 9/0644
USPC ....................................................... 174/15.7
See application file for complete search history.

(56) References Cited

U.S. PATENT DOCUMENTS

| | | | | |
|---|---|---|---|---|
| 2,939,902 | A | * | 6/1960 | Wreford .................... 174/15.7 |
| 3,281,571 | A | * | 10/1966 | Gilmore .................... 219/137.9 |
| 4,853,516 | A | * | 8/1989 | Julien et al. ............... 219/137.9 |
| 5,274,013 | A | | 12/1993 | Lieux |
| 6,228,790 | B1 | * | 5/2001 | Ting et al. .................... 502/102 |
| 7,135,655 | B2 | * | 11/2006 | Tomiyasu et al. .......... 219/137.9 |
| 2003/0059613 | A1 | * | 3/2003 | Tirelli et al. ................. 428/375 |
| 2003/0164483 | A1 | * | 9/2003 | Scelza et al. ................. 252/601 |
| 2006/0000633 | A1 | | 1/2006 | Hopper |
| 2008/0273738 | A1 | * | 11/2008 | Smith ........................... 381/386 |
| 2009/0209672 | A1 | * | 8/2009 | Ebata et al. .................. 521/150 |
| 2010/0143630 | A1 | * | 6/2010 | Gong et al. .................. 428/36.8 |

FOREIGN PATENT DOCUMENTS

| | | |
|---|---|---|
| CN | 101585951 | 11/2009 |
| JP | 06-283052 A * | 10/1994 |
| JP | 08-064039 A * | 3/1996 |
| JP | 09-265838 A * | 10/1997 |

OTHER PUBLICATIONS

Machine translation of Japan Patent document No. 6-283,052, Mar. 2015.*

(Continued)

*Primary Examiner* — Geoffrey S Evans
(74) *Attorney, Agent, or Firm* — Fildes & Outland, P.C.

(57) ABSTRACT

A robotic welding cable for a welding torch includes a flexible hose defining a hollow core for passage of welding wire and shielding gas. Conductor strands are arranged around the flexible hose. A composite layered covering includes electrical insulation that covers the conductor strands and an outer jacket that surrounds the electrical insulation. The electrical insulation is formed of an Ethylene Propylene Diene Monomer (EPDM) synthetic rubber, and the outer jacket is formed of a Chlorinated Polyethylene (CPE) synthetic rubber.

4 Claims, 1 Drawing Sheet

(56) References Cited

OTHER PUBLICATIONS

Machine translation of Japan Patent document No. 8-064,039, Mar. 2015.*

Machine translation of Japan Patent document No. 9-265,838, Mar. 2015.*
English abstract for CN 101585951.
ISR and Written Opinion in PCT/US2014/013478 dated May 19, 2014.

* cited by examiner

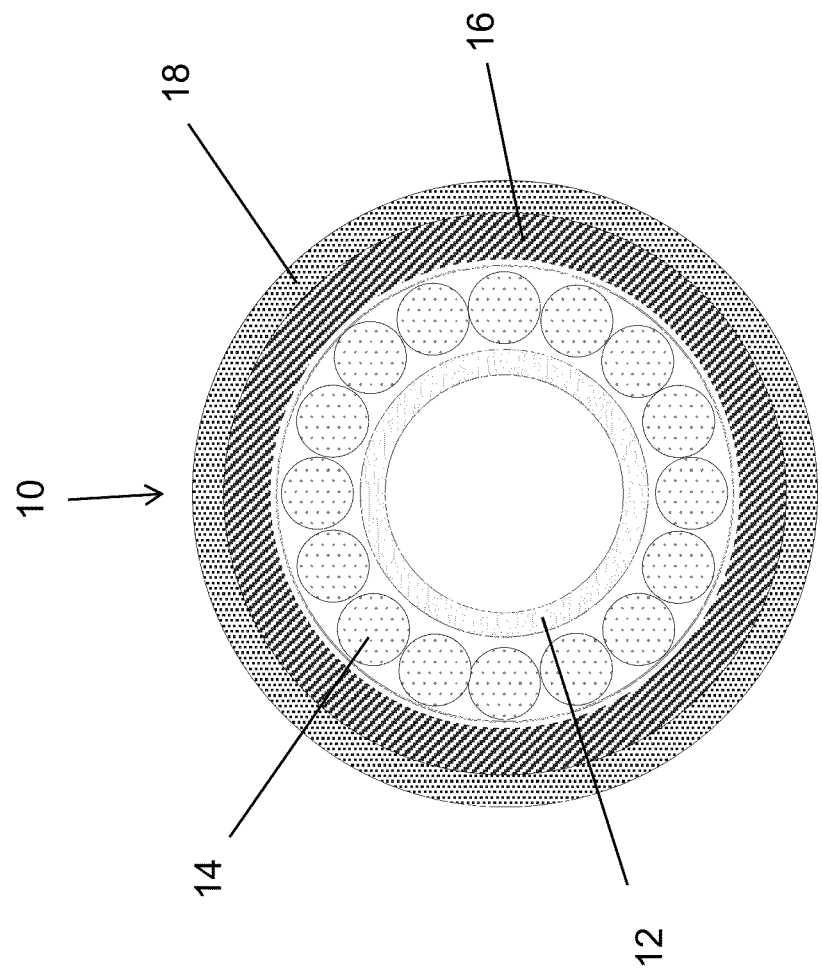

ROBOTIC WELDING CABLE

CROSS REFERENCE TO RELATED APPLICATION

This application claims the priority of U.S. Provisional Application No. 61/759,509 filed Feb. 1, 2013.

TECHNICAL FIELD

This disclosure relates to welding, and more particularly to a welding cable for robotic welding.

BACKGROUND OF THE INVENTION

It is known in the art relating to welding to utilize a flexible cable to deliver power, shielding gas, electrode wire, and sometimes cooling water to a welding torch. The welding cable generally includes a flexible hose at the core which carries welding wire and process gas to the welding torch, and conductor strands arranged around the flexible hose for providing power to the torch. Electrical insulation and an outer jacket cover the conductor strands and hose. One such cable-hose assembly is specified in IEC 60974-7.

Welding cables used in robotic welding applications are typically required to perform on automation lines and welding cells for up to 80% duty cycle. Also, lean manufacturing demands reduced cycle times and increased welding speeds, which results in high welding currents. A need exists for a more durable welding cable that can meet the demands of automated robotic welding applications.

Conventional robotic welding cables use various plastic and rubber formulations as insulation. Thermoplastic polymers lose their strength at higher temperatures. This results in a short service life of the cable.

SUMMARY OF THE INVENTION

Disclosed is a robotic welding cable that is more durable and that has a significantly improved service life in comparison to conventional welding cables. The welding cable resists fatigue and degradation caused by ultraviolet light and industrial chemicals, and can perform in hot and humid environments.

More particularly, a robotic welding cable for a welding torch includes a flexible hose defining a hollow core for passage of welding wire and shielding gas. Conductor strands are arranged around the flexible hose. A composite layered covering includes electrical insulation that covers the conductor strands and an outer jacket that surrounds the electrical insulation. The electrical insulation is formed of an Ethylene Propylene Diene Monomer (EPDM) synthetic rubber, and the outer jacket is formed of a Chlorinated Polyethylene (CPE) synthetic rubber.

The electrical insulation layer provides electrical and thermal resistance, as well as strength and flexibility over a range of temperatures. The outer jacket layer provides protection and flexibility.

A method of assembling a robotic welding cable for use with a welding torch includes the steps of: providing a flexible hose that defines a hollow core for passage of welding wire and shielding gas to the welding torch; arranging conductor strands around the flexible hose; covering the conductor strands with electrical insulation, the electrical insulation being formed of an Ethylene Propylene Diene Monomer (EPDM) synthetic rubber; and surrounding the electrical insulation with an outer jacket, the outer jacket being formed of a Chlorinated Polyethylene (CPE) synthetic rubber.

These and other features and advantages of the assembly will be more fully understood from the following detailed description of the invention taken together with the accompanying drawings.

BRIEF DESCRIPTION OF THE DRAWINGS

In the drawings:

FIG. 1 is a cross-sectional view of a robotic welding cable.

DETAILED DESCRIPTION OF THE INVENTION

A robotic welding cable 10 includes a flexible core tube 12 that allows for transport and passage of inert shielding gas and consumable welding wire from a source to a welding torch. Conductor strands 14 are arranged around the flexible core tube for delivering welding power from a welding power source to the welding torch. The flexible core tube 12 and conductor strands 14 are surrounded by a composite layered covering of an inner electrical insulation layer 16 of EPDM rubber or similar as an insulating material and an outer jacket layer 18 of CPE rubber or similar. The composite layered covering of EPDM and CPE significantly extends the service life of the welding cable.

EPDM (Ethylene Propylene Diene Monomer) synthetic high-density rubber forming the electrical insulation layer 16 has outstanding electrical properties and heat resistance, and has suitable strength for welding applications along with excellent flexibility at high and low temperatures.

CPE (Chlorinated Polyethylene) based synthetic rubber forming the outer jacket layer 18 thus can be cross-linked by an irradiation process for higher strength and resistance. CPE synthetic rubber has excellent tear strength, weather resistance, abrasion resistance, and resistance to ozone, oil, and other chemicals. The CPE rubber jacket protects the EPDM rubber insulation while maintaining the flexibility of the welding cable assembly.

Although the assembly has been described by reference to a specific embodiment, it should be understood that numerous changes may be made within the spirit and scope of the inventive concepts described. Accordingly, it is intended that the assembly not be limited to the described embodiment, but that it have the full scope defined by the language of the following claims.

What is claimed is:

1. A robotic welding cable for a welding torch, said welding cable comprising:
   a flexible hose defining a hollow core for passage of welding wire and shielding gas;
   conductor strands arranged around said flexible hose; and
   a composite layered covering including electrical insulation covering said conductor strands, and an outer jacket surrounding said electrical insulation;
   said electrical insulation being formed of an Ethylene Propylene Diene Monomer (EPDM) synthetic rubber, and said outer jacket being formed of a Chlorinated Polyethylene (CPE) synthetic rubber.

2. The robotic welding cable of claim 1, wherein the electrical insulation provides electrical and thermal resistance, and strength and flexibility over a range of temperatures.

3. The robotic welding cable of claim 1, wherein the outer jacket provides protection and flexibility.

4. A method of assembling a robotic welding cable for use with a welding torch, said method comprising:

providing a flexible hose that defines a hollow core for passage of welding wire and shielding gas to said welding torch;
arranging conductor strands around said flexible hose;
covering said conductor strands with electrical insulation, said electrical insulation being formed of an Ethylene Propylene Diene Monomer (EPDM) synthetic rubber;
surrounding said electrical insulation with an outer jacket, said outer jacket being formed of a Chlorinated Polyethylene (CPE) synthetic rubber.

\* \* \* \* \*